United States Patent Office 2,779,446
Patented Jan. 29, 1957

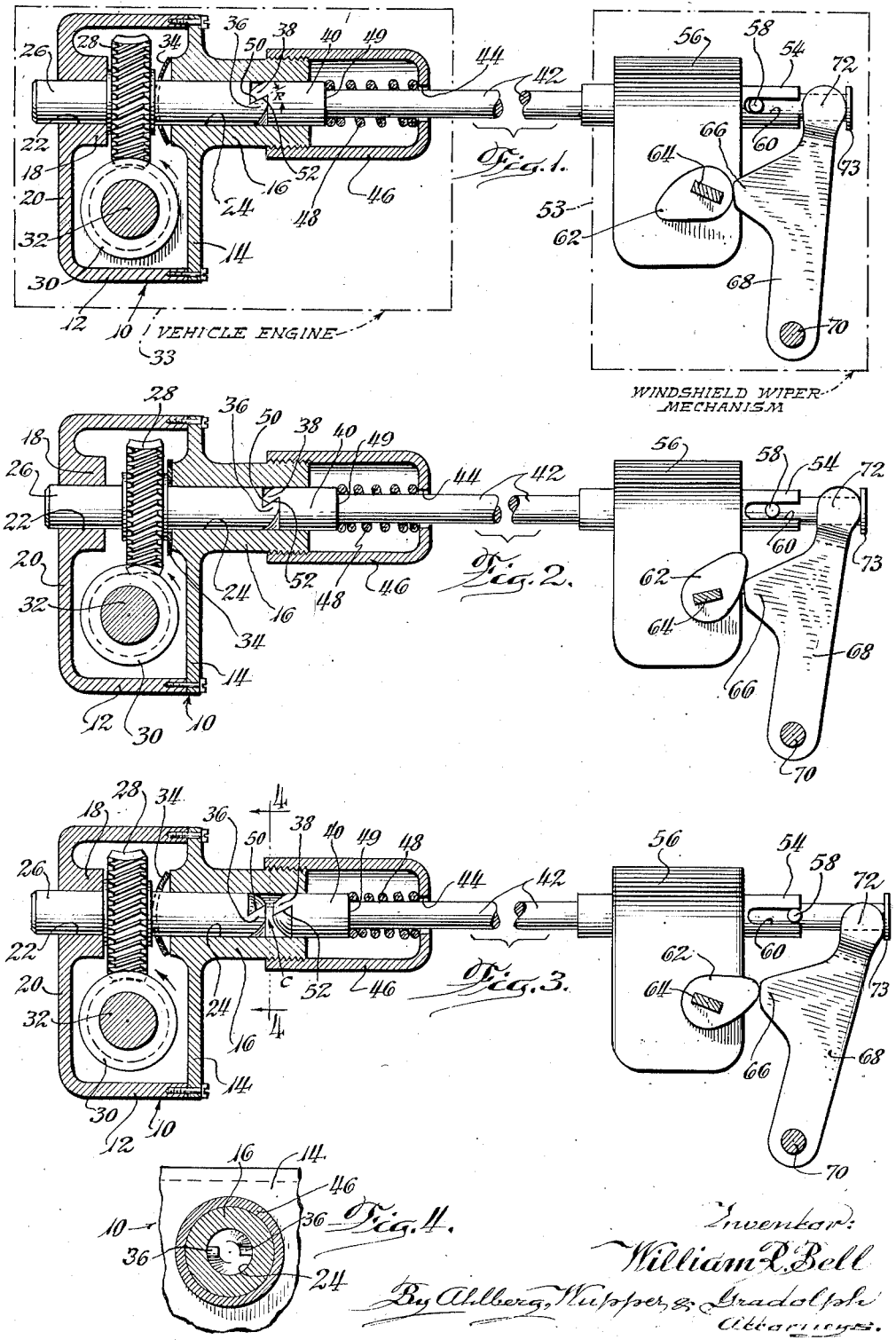

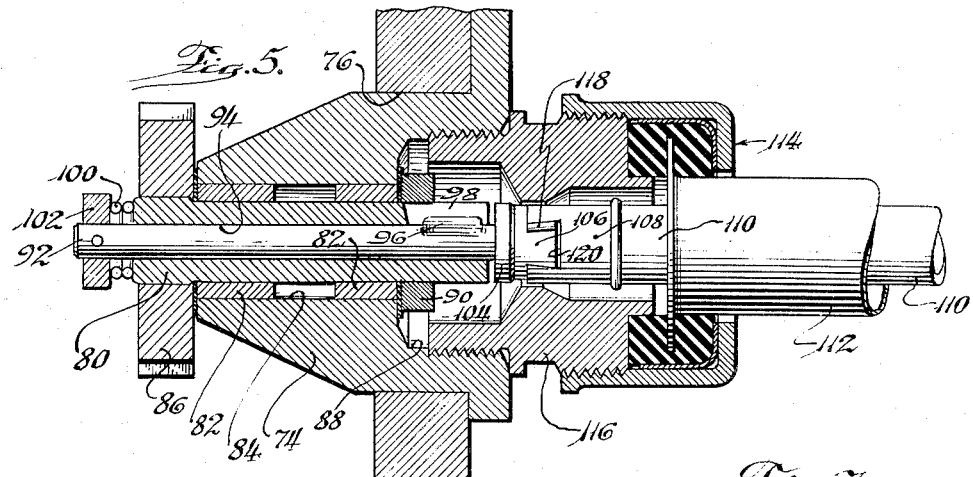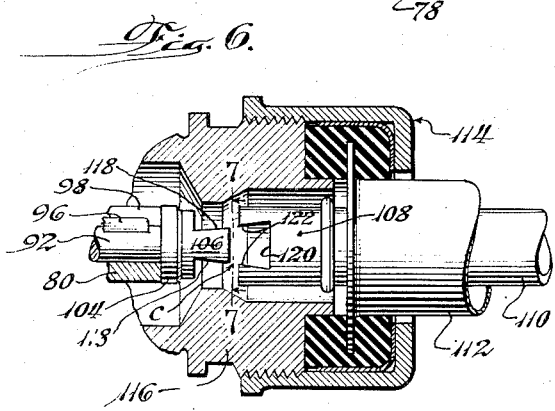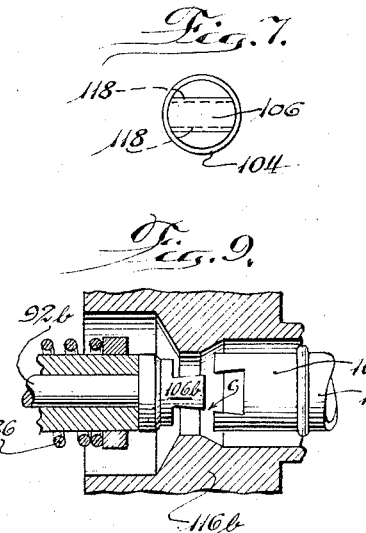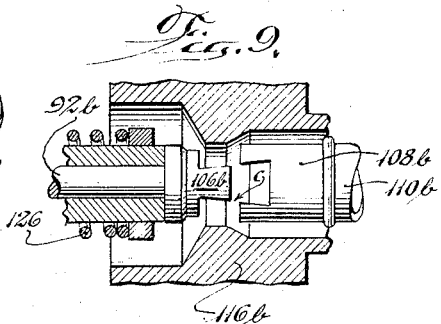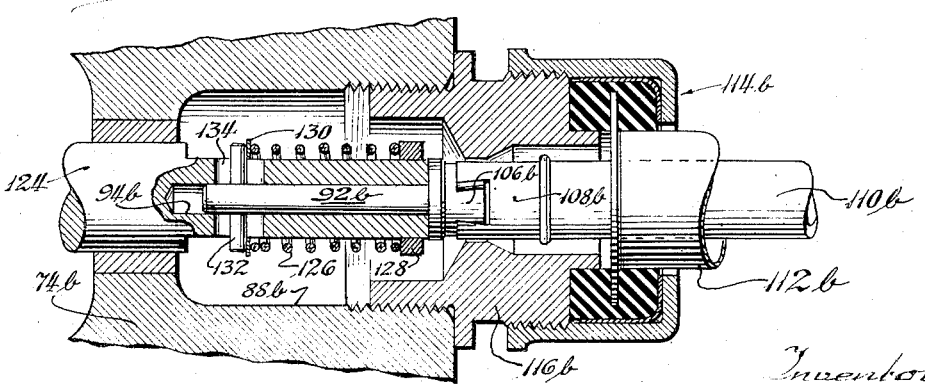

2,779,446

DOG CLUTCH DRIVE FOR WINDSHIELD WIPERS AND THE LIKE

William R. Bell, Skokie, Ill., assignor to Stewart-Warner Corporation, Chicago, Ill., a corporation of Virginia Application April 19, 1954, Serial No. 423,906

8 Claims. (Cl. 192—33)

The present invention relates to dog clutch drives suited for operating engine driven windshield wipers and the like. To minimize wear on a windshield wiper drive of this character when the wiper is not operating it is desirable to locate the dog clutch of the drive near the power take-off from the engine.

Reliable operation of a drive of this character requires that the dog clutch of the drive be held firmly in engaged position. Hence it may be necessary to use considerable force to disengage the clutch. For simplicity and ease of operation it is desirable to disengage the dog clutch of an engine driven windshield wiper drive by power supplied through a power shaft from the clutch to control structure which applies an axial declutching force to the shaft. While initial disengagement of the clutch in this manner can be effected very simply, it is more difficult to separate the coacting clutch elements sufficiently to eliminate chattering, since the power supply to the control structure is cut short as soon as the clutch connection is broken.

Previous attempts to avoid clutch chatter in such drives have included the incorporation of over center spring arrangements of considerable complexity into the clutch controls. However, this expedient has complicated the clutch control structure and added considerably to its cost without being wholly satisfactory in other respects.

One object of the invention is to provide an improved dog clutch drive in which coacting elements of the dog clutch can be separated sufficiently to avoid chattering by a simple declutching control operated by power transmitted through the clutch.

Another object is to provide an improved dog clutch drive in which coacting clutch elements, capable of resisting disengagement during the transmission of torque therethrough, are upon initial disengagement by an applied declutching force further separated to prevent chattering by biasing means incorporated into the drive to act in opposition to the resistance of the clutch elements to disengagement during the application of the declutching force thereto.

A more specific object is to provide an improved dog clutch drive of the character recited in the preceding object in which the coacting clutch elements are shaped to induce an axial force therebetween as an incident to the transmission of torque therethrough, which yieldably resists disengagement of the clutch.

Other objects and advantages will become apparent from the following description of exemplary forms of the invention illustrated in the drawings, in which:

Figure 1 is a partially sectioned and partially schematic side view of a windshield wiper drive incorporating the invention, showing the drive in running position;

Fig. 2 is a view similar to Fig. 1 showing an intermediate stage of the disengagement of the dog clutch;

Fig. 3 is a view similar to Fig. 2 showing the drive after disengagement of the dog clutch;

Fig. 4 is a fragmentary sectional view taken along the line 4—4 of Fig. 3;

Fig. 5 is a longitudinal sectional view of a modified form of the invention, showing an intermediate stage in the disengagement of the dog clutch;

Fig. 6 is a fragmentary sectional view similar to a portion of Fig. 5, showing the dog clutch in fully disengaged position;

Fig. 7 is an end view of the driving clutch member taken along the line 7—7 of Fig. 6;

Fig. 8 is a longitudinal sectional view of another modified embodiment of the invention showing the dog clutch in fully engaged position; and Fig. 9 is a fragmentary sectional view corresponding to a portion of Fig. 8 and showing the dog clutch in fully disengaged position.

As shown in Figs. 1 to 4, the first embodiment of the invention comprises a gear casing 10 formed by a cup-shaped casting 12 closed at one side by a generally flat, vertical member 14. A boss 16 on the upper portion of the member 14 extends both inwardly and outwardly of the main body of the member in axial alignment with an internal boss 18 on the opposite side 20 of the casting 12.

Aligned bores 22, 24 extending axially through the respective bosses 18, 16 support opposite ends of a cylindrical driving shaft 26. A spiral gear or worm wheel 28 fixed to the driving shaft 26 between the inner ends of the bosses 16, 18 is rotated by a spiral gear or worm 30 on a transverse shaft 32 journaled in the lower portion of the casing 10. The shaft 32 is rotated in the counterclockwise direction, as indicated by the arrows in Figs. 1 to 3, by a power source such as a vehicle engine (indicated schematically at 33).

The driving shaft 26, axially slidable in its support bores 22, 24 is biased to the left (Figs. 1 to 3) by a centrally apertured concavo-convex disc spring 34 encircling the shaft between the inner end of the boss 16 and the adjacent side of the gear 28. The distance between the opposed inner ends of the two casing bosses 16, 18 exceeds the combined thicknesses of the gear 28 and the spring 34 to provide for a limited axial movement of the gear and the shaft 26 in the casing 10.

The right end of the driving shaft 26 operates in an intermediate portion of the bore 24 extending through the boss 16. This end of the shaft is shaped to form a plurality of dog clutch elements 36 adapted to coact with similar dog clutch elements 38 formed on the inner end of a cylindrical, driven member 40 journaled in the outer end of the bore 24.

The driven member 40 is connected to a flexible shaft 42 extending outwardly through a central aperture 44 in a horizontally elongated cup 46 fitted over the outer end of the casing boss 16. A coiled compression spring 48 encircling the shaft 42 between the cup 46 and a shoulder 49 on the outer end of the driven member 40 urges the latter toward the driving shaft 26.

As shown in Figs. 1 to 4, the dog clutch elements 36 on the driving shaft 26 are formed by two axially projecting teeth (also denoted by the numeral 36) on diametrically opposite sides of the shaft. The leading radial edges of the clutch teeth 36, with respect to the direction of rotation of the shaft 26, are progressively undercut from the outer to the inner ends of the teeth to form generally flat clutching surfaces 50 having a negative rake or slope indicated by the angle R in Fig. 1. Thus, the inner ends of the surfaces 50 lag the outer ends of the surfaces with respect to the direction of driving shaft rotation.

The clutch elements 38 on the driven member 40 are similar in construction to the driving clutch members 36 and form progressively undercut clutch surfaces 52 adapted to make face to face clutching engagement with the clutch surfaces 50 on the driving clutch elements 36.

The flexible shaft 42 may extend into driving engagement with the oscillating mechanism of a windshield wiper or the like (indicated schematically at 53).

Axial declutching movement is applied to the flexible shaft 42 by power transmitted to the shaft through the dog clutch connection from the driving shaft 26. As shown, the flexible shaft 42 extends slidably through a sleeve 54 journaled in a housing 56. A transverse pin 58 in the shaft 42 projects into an axial slot 60 in the sleeve to rotate the sleeve.

A single lobe declutching cam 62 is fixed to a shaft 64 journaled in the housing 56 and rotated through suitable gearing from the sleeve 54. The particular construction of this cam, and the manner in which it operates, may be of the type shown in the patent to W. R. Bell, et al., No. 2,667,249, but for the sake of brevity, a simplified construction is shown and described here:

A follower lever 68 having a follower projection 66 has one end pivoted on a pin 70 and its other end 72 bifurcated to engage a collar 73 at the end of the driven shaft 42 which projects from the sleeve 54. The pivoted end of the lever 68 is movable substantially longitudinally of the pivot 70 so as to shift the projection 66 into or out of the plane of the cam 62. As shown in Fig. 1, the projection 66 does not lie in the plane of the cam 62.

To review the operation of the improved dog clutch drive thus formed, it should be noted that rotation of the worm shaft 32 in the counterclockwise direction, Figs. 1 to 3, rotates the driving shaft 26 in the counterclockwise direction, as viewed from the left in Figs. 1 to 3. The frictional force of the worm 30 on the gear 28 produces an axial thrust on the gear which complements the action of the spring 34 to move the gear to the left (Fig. 1) into engagement with the boss 18. If the thrust due to the friction between gears 28 and 30 is sufficiently great the dished spring 34 may be omitted.

To put the drive into operation, the operator manually shifts the pivoted end of the lever 68 lognitudinally of the pivot 70 to move the follower 66 out of alignment with the cam 62. The lever 68 is then swung counterclockwise by the spring 48 which pulls the shaft 42 to the left causing engagement of the clutch elements 38 with the is driving clutch elements 36.

Due to the negative rake or slope of the coacting clutch surfaces 50, 52 the transmission of torque through the clutch elements 36, 38 to the driven member 40, induces a thrust between the driving shaft 26 and the driven member tending to hold the coacting dog clutch elements yieldably yet firmly in clutched engagement.

The positive drive thus formed to the driven member 40 is disconnected by power supplied through the clutch to the driven member. This is accomplished by manually applying a force urging the lever 68 back toward the plane of the cam 62. When the lobe of the cam 62 is turned away from the follower 66, as shown in Fig. 1, the lever 68 will move into the plane of the cam. Continued rotation of the cam 62 swings the lever 68 clockwise moving the shaft 42 and driven member 40 to the right against the springs 48 (Fig. 2).

The mutual thrust action induced between the driving and driven clutch elements 36, 38, as an incident to the continued transmission of torque therethrough, pulls the driving shaft 26 to the right against the spring 34 and the biasing action of the gears 28 and 30. However, this axial movement of the driving shaft 26 is terminated upon flattening of the spring 34 against the inner end of the boss 16 (Fig. 2).

Continued movement of the driven member 40 to the right by the cam 62 disconnects the driven clutch elements 38 from the driving clutch elements 36. The driven member 40 immediately stops rotating, leaving a high point on the declutching cam 62 in engagement with the cam follower 66. The spring 34 and the biasing action of the gears 28 and 30 shift the driving shaft 26 away from the driven member 40 to create an axial working clearance, indicated by the letter C in Fig. 3, between the dog clutch elements 36 and 38. This clearance, which is equal to the axial play of the gear 28 in the casing 10, is sufficient to completely avoid chattering while the clutch is disengaged.

The dog clutch drive forming the modified embodiment of the invention shown in Figs. 5 to 7 is supported in a sleevelike insert 74 mounted in an opening 76 in a flat vertical member 78 on a vehicle engine or the like (not shown) serving as a power source for the drive. A horizontal driving sleeve 80 is journaled by two bearings 82 in an axial bore 84 in the insert 74 and rotated by a gear 86 fixed to the left end of the sleeve, which extends somewhat beyond the insert (Fig. 1).

The end of the sleeve 80 opposite from the gear 86 protrudes into a large counterbore 88 in the insert 74 opening outwardly from the gear. Axial movement of the sleeve 80 in the insert 74 is prevented by the gear 86 and a collar 90 fixed to the inner end of the sleeve adjacent the bottom of the counterbore 88.

A stem 92, somewhat longer than the sleeve 80, is mounted in an axial bore 94 in the sleeve for axial sliding movement therein. Rotation of the stem 92 with the sleeve 80 is effected by a radial projection 96 on the stem which extends slidably into an axial slot 98 in the end of the sleeve opposite from the gear 86. The stem 92 is biased to the left, with reference to Fig. 1, by a coiled compression spring 100 encircling the stem between the left end of the sleeve 80 and a collar 102 fixed to the adjacent extreme end of the stem.

An enlarged circular head 104 on the right end of the stem 92 is normally biased into engagement with the adjacent end of the driving sleeve 80, as shown in Fig. 6.

An elongated clutch element 106 extending transversely across the head 104 projects outwardly from the head to coact with a clutch element 108 on a driven member 110 mounted in a sheath 112. The adjacent end of the sheath 112 is supported by an annular resilient mount 114 on the outer end of a centrally bored member 116 threaded into the counterbore 88 in the insert 74.

The driven member 110 is shifted axially in the sheath 112 to move the clutch element 108 into and out of clutch engagement with the driving clutch element 106 by operating means similar to that used in conjunction with the first form of the invention just described.

The driving clutch element 106 is shaped to define two generally flat clutch faces 118 extending transversely across opposite sides of the clutch element and diverting progressively away from each other toward the outer end of the clutch element at acute angles relative to the rotary axis of the stem 92.

The driven clutch element 108 forms a transverse recess 120 adapted to receive the driving clutch element 106. From an inlet having a width sufficient to receive the thickened outer end of the driving clutch element 106, the recess 120 is progressively widened toward its base to define progressively undercut clutch faces 122 inclined in relation to the axis of the driven member 110 at acute angles to mate with the inclined clutch faces 118 of the driving clutch element 106.

A driving connection from the stem 92, rotated by the gear 86, to the driven member 110 is established by shifting the driven member to the left, with reference to Fig. 5, to engage the clutch element 108 with the driving clutch element 106. At this time the enlarged head 104 on the stem 92 is held in engagement with the adjacent end of the sleeve 80 by the spring 100.

Upon entering the recess 120 of the driven clutch element 108, the driving clutch element 106 turns in the recess sufficiently to engage the inclined driving clutch faces 118 with the driven clutch faces 122. Due to the undercut inclination of the abutting clutch faces 118, 122 the transmission of torque through the clutch elements 106, 108 induces a thrust between these coacting parts tending to hold them firmly yet yieldably in mutual engagement.

Disconnection of the driven member 110 from the driving sleeve 80 is effected by moving the driven member axially to the right, with reference to Fig. 5. The thrust induced between the engaged clutch elements 106, 108 as an incident to the continued transmission of torque therethrough causes the driving clutch element 106 and the stem 92 to follow the axial movement of the driven clutch element 108 against the force of the spring 100 until the spring is fully compressed, as shown in Fig. 5.

Continued declutching movement of the driven clutch element 108 breaks the driving connection to the driven member 110. The spring 100 immediately shifts the driving clutch element 106 and the stem 92 to the left, as shown in Fig. 6, to provide an axial running clearance C between the driving and driven clutch elements sufficient to prevent chattering.

A dog clutch drive embodying a second modified form of the invention illustrated in Figs. 8 and 9 comprises an organization of structural parts generally similar to the first modified form of the invention just described. Structural elements of this second modified form of the invention, forming counterparts of elements used in the first modified form of the invention, are denoted by the same reference numerals with the addition of the letter $b$.

As shown, the dog clutch drive of this second modified form of the invention is designed to operate a driven member 110b from one end of a relatively long drive shaft 124. The counterbore 88b in the support 74b is deepened to provide working space for a coiled compression spring 126 encircling the shaft 124 between a collar 128 on the right end of the shaft (Fig. 8) and a movable spring seat 130 engaging opposite ends of a transverse pin 132 projecting outwardly from an axial slot 134 cut transversely all the way through the shaft. The pin 132 extends through the stem 92b mounted in an axial bore 94b which extends into only the end portion of the shaft 124 projecting into the counterbore 88b.

Rotary movement of the shaft 124 and the stem 92b is transmitted to the driven member 110b through driving and driven clutch elements 106b and 108b similar to those used in the previously described form of the invention illustrated in Figs. 5 to 7. When the driving connection to the driven member 110b is broken by axial movement of the member to the right (Fig. 9), the spring 126 shifts the stem 92b and driving clutch element 106b to the left to provide an axial working clearance C between the driving and driven clutch elements, which avoids chattering.

While I have shown and described preferred embodiments of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A dog clutch drive adapted for energizing a windshield wiper from a vehicle engine and comprising, in combination, a driving member adapted for rotation by a vehicle engine, a driven member adjacent the driving member, a flexible shaft extending from the driven member, declutching means operated by the flexible shaft for applying axial movement to the shaft by power supplied therethrough, dog clutch means on the driving and driven members, and the dog clutch means defining coacting clutch faces progressively undercut to induce an axial thrust between the clutch means of the driving and driven members resistant to disengagement thereof as an incident to the transmission of torque therethrough to the driven member.

2. In a dog clutch drive, the combination of two rotary substantially coaxial drive members constituting a rotary driving member and a rotary driven member, coacting dog clutch elements on said respective drive members defining mutually engageable clutch faces progressively undercut to induce a yieldable interlocking thrust therebetween for resisting disengagement of the clutch elements as an incident to the transmission of torque therethrough, means supporting one of the drive members and providing for axial movement thereof, means for limiting the extent of axial movement of said one drive member, a disc spring mounted to urge said one drive member in a direction for moving the clutch element thereof away from clutch element of the other drive member, and control means interconnected with the other clutch member for applying axial declutching force thereto compressing the disc spring by the interlocking action between the clutch elements, the disc spring serving to further separate the coacting dog clutch elements to produce a running clearance therebetween upon initial disengagement thereof by the control means.

3. In a clutch drive, the combination of a rotary driving member, a stem slidable in an axial bore in the driving member and supporting dog clutch means at one end thereof, an axially movable rotary driven member mounted in axial alignment with the driving member and having dog clutch means on one end thereof disposed adjacent the dog clutch means on the stem, the driving member and the driven member together constituting two drive members, the dog clutch means of both drive members defining progressively undercut clutch faces for inducing a yieldable interlocking action therebetween resistant to declutching movement as an incident to the transmission of torque therethrough, a biasing spring interconnected with the stem to urge the latter in a direction extending away from the dog clutch means, and control means connected with the driven member for applying axial declutching force thereto.

4. A dog clutch drive comprising, in combination, a rotary drive member, means on the drive member defining a transverse clutch element projecting outwardly along the axis of the drive member, the clutch element being progressively thickened toward its outer end to define on opposite sides two clutch faces diverging away from each other toward the outer end of the clutch member, means supporting the drive member for axial movement, biasing means connected to the drive member for urging the latter axially in a direction extending away from the clutch member, a rotary driven member mounted in axial alignment with the drive member for axial movement relative thereto, a driven clutch element on the driven member opposing the driving clutch element and defining a transverse opening having an inlet sufficiently wide to permit entry of the driving clutch element, the opening being progressively widened toward the bottom thereof to define two undercut clutch faces positioned to mate with the diverging clutch faces of the driving clutch element, and means for applying axial declutching force to the driven member.

5. A dog clutch drive adapted for energizing a vehicle windshield wiper from the vehicle engine and comprising, in combination, two rotary substantially coaxial drive members constituting a driving member adapted for rotation by a vehicle engine and a driven member adjacent the driving member, means supporting said driven member for axial movement relative to said driving member, a flexible shaft connected to said driven member, declutching means operated directly by power supplied through said shaft for applying an axial declutching movement to said shaft and the connected driven member, coacting clutch means on the driving and driven members, said clutch means defining mutually engageable dog clutch faces progressively undercut to induce a thrust between the engaged clutch means of the driving and driven members resistant to disengagement thereof as in incident to the transmission of torque therethrough to said driven member, and yieldable biasing means connected to one of said drive members, said biasing means being continuously free of resistant to yieldably apply force to said one drive member along the axis thereof in opposition to the thrust induced between said clutch means on said drive members during the application of declutching force to said flexible shaft, the strength of said yieldable biasing means and the degree of undercut of said dog clutch faces being coordinated to limit the effective axial force of said biasing means on the connected drive member to a value substantially less than the thrust induced between said engaged clutch means of the two drive members as an incident to the transmission of a normal torque load therethrough.

6. A dog clutch drive comprising, in combination, two rotary substantially coaxial drive members constituting a rotary driving member and a rotary driven member, coacting dog clutch means on the respective drive members forming mutually engageable clutch faces progressively undercut to produce a yieldable interlocking thrust between the engaged clutch means resistant to disengagement thereof as an incident to the transmission of torque therethrough, control means for applying axial force to one of said drive members for declutching the latter from the other drive member, operating means connected between said driven member and said control means for energizing the later by power supplied directly through the driven member during each declutching operation, and yieldable biasing means connected to one of said drive members, said biasing means being continuously free of restraint to yieldably apply force to said one drive member along the axis thereof to urge the clutch means thereof away from the clutch means of the other drive member against the yieldable interlocking action therebetween to effect an operating clearance therebetween after initial declutching thereof by said control means, the strength of the yieldable biasing means and the degree of undercut of said clutch faces being coordinated to limit the effective axial force of the biasing means on the connected drive member to a value substantially less than the thrust induced between the engaged clutch means of the two drive members as an incident to the transmission of a normal torque load therethrough.

7. A clutch drive adapted for disengagement by power supplied directly through the drive during disengagement thereof and comprising, in combination, two rotary substantially coaxial drive members constituting a driving member and a driven member, means movably supporting at least one of said drive members for axial movement relative to the other drive member, coacting clutch means on the respective drive members for mutual engagement and disengagement as an incident to axial displacement in opposite directions of said drive members relative to each other, said clutch means on both drive members having mutually engageable clutch elements formed with an undercut shaping to induce a yieldable interlocking action therebetween along the axes of the drive members for resisting disengagement of the clutch means on the two drive members during the transmission of torque therethrough, means for applying axial force to one of the drive members mounted for axial movement to effect initial disengagement of the clutch means thereon from the clutch means of the other drive member, and yieldable biasing means continuously connected with one of the drive members mounted for axial movement, said biasing means being continuously free of restraint to apply force to said last mentioned one drive member along the axis thereof in opposition to any axial force transmitted from the other drive member through the mutually engaged clutch means tending to disengage the clutch means of the two drive members, said biasing means thus serving as an incident to initial disengagement of the clutch means on the two drive members to displace the clutch means of said last mentioned one drive member from the clutch means of the last mentioned other drive member to avoid chattering after declutching, said yieldable biasing means having a strength coordinated with the undercut shaping of said clutch elements to the effect that the maximum effective axial force of the biasing means on the drive member connected thereto does not exceed said yieldable interlocking action induced between the engaged clutch means of both drive members as an incident to the transmission of a normal torque load therethrough.

8. A dog clutch drive comprising, in combination, two rotary substantially coaxial drive members, support means supporting both drive members for axial movement relative to the support means and to each other, coacting dog clutch means on said respective drive members defining mutually engageable clutch faces progressively undercut to induce when engaged a yieldable interlocking thrust therebetween for resisting disengagement of the clutch means on the respective drive members as an incident to the transmission of torque therethrough, means coacting with one of said drive members to limit the axial movement thereof to a range approximating the desired running clearance between the coacting clutch means after declutching, resilient biasing means connected to said one drive member for biasing the latter in a direction to move the clutch means thereon away from the clutch means of the other drive member, and control means connected to said other drive members for applying axial declutching force thereto to effect initial disengagement of the clutch elements on the two drive members, said biasing means being continuously free of restraint to serve automatically upon initial disengagement of the coacting clutch means to further separate the clutch means on the two drive members to create a running clearance therebetween, the strength of said resilient biasing means and the degree of undercut of said clutch faces being coordinated to limit the effective axial force of said biasing means on the connected drive member to a value substantially less than the thrust induced between said engaged clutch means of the two drive members as an incident to the transmission of a normal torque load therethrough.

References Cited in the file of this patent

UNITED STATES PATENTS

| 1,515,100 | Foster | Nov. 11, 1924 |
| 2,121,233 | Horton | June 21, 1938 |
| 2,125,505 | Kritz | Aug. 2, 1938 |
| 2,129,620 | Horton | Sept. 6, 1938 |
| 2,223,660 | Horton | Dec. 3, 1940 |
| 2,243,042 | Stahl | May 20, 1941 |
| 2,532,266 | Andres | Nov. 28, 1950 |
| 2,667,249 | Bell et al. | Jan. 26, 1954 |